May 22, 1951 — C. GORBETT — 2,553,854
APPARATUS FOR PULLING RAILS
Filed May 19, 1948 — 2 Sheets-Sheet 1

Inventor
CLEON GORBETT
By Jennings & Carter
Attorneys

May 22, 1951  C. GORBETT  2,553,854
APPARATUS FOR PULLING RAILS
Filed May 19, 1948  2 Sheets-Sheet 2
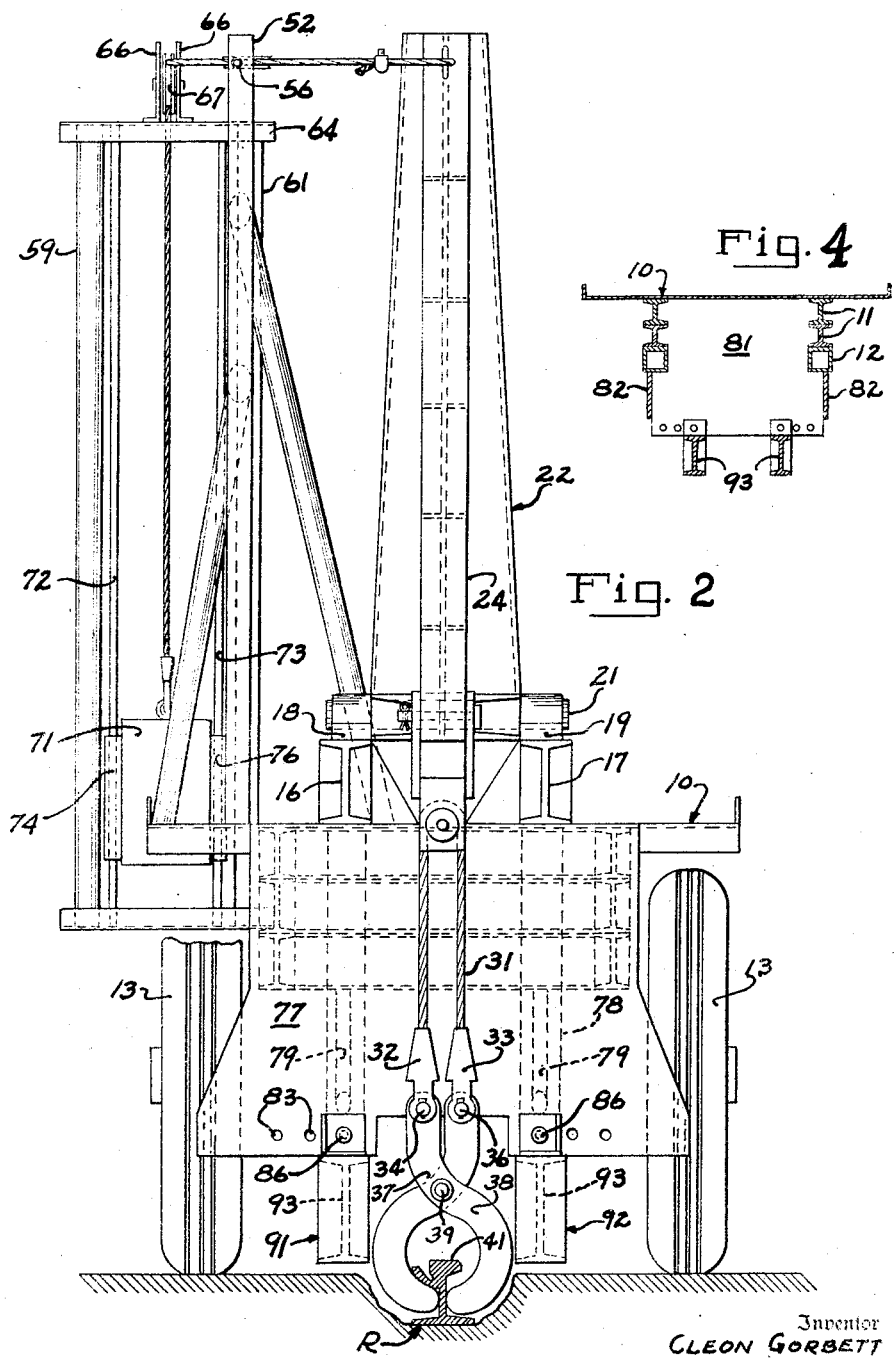
Inventor
CLEON GORBETT
By Jennings & Carter
Attorneys Patented May 22, 1951

2,553,854

UNITED STATES PATENT OFFICE 2,553,854

APPARATUS FOR PULLING RAILS

Cleon Gorbett, Fort Worth, Tex.

Application May 19, 1948, Serial No. 27,893

4 Claims. (Cl. 254—121)

My present invention relates to apparatus for pulling rails from a roadbed, and has for an object the provision of apparatus of the character designated especially adapted for removing rails of a street railway, which, as is understood, generally are imbedded in the street level with the surface thereof.

Another object is to provide apparatus of the character designated which may be mounted on a pneumatic tired motor vehicle of standard construction and embodying means to transmit the pulling stresses imposed on the vehicle directly to the roadbed or street, thus permitting the use of a relatively light weight vehicle, relieving the stresses on the pneumatic tires thereof, and maintaining the mobility of the unit.

Another object is to provide apparatus for removing rails in which the pulling mechanism embodies a lever pivotally mounted on the bed of the vehicle, to which a rail grappling hook is operatively connected, together with a weight operable to cause the lever to be raised when the operating cable therefor is slackened, thus placing the grappling hooks in position for attachment to the rail without having to manually raise the lever.

A further object is to provide apparatus of the character designated which shall be simple and rugged of construction yet light in weight, and in which the ground or roadbed engaging members may be easily and quickly removed for loading on the vehicle, thus permitting the vehicle to travel with normal road clearance when moving to or from a work site.

Apparatus embodying features of my invention is illustrated in the accompanying drawings forming a part of this application in which:

Fig. 2 is an enlarged rear elevational view of the apparatus shown in Fig. 1 and partly broken away;

Fig. 4 is a detail sectional view taken along line IV—IV of Fig. 1.

Figures 1, 3:
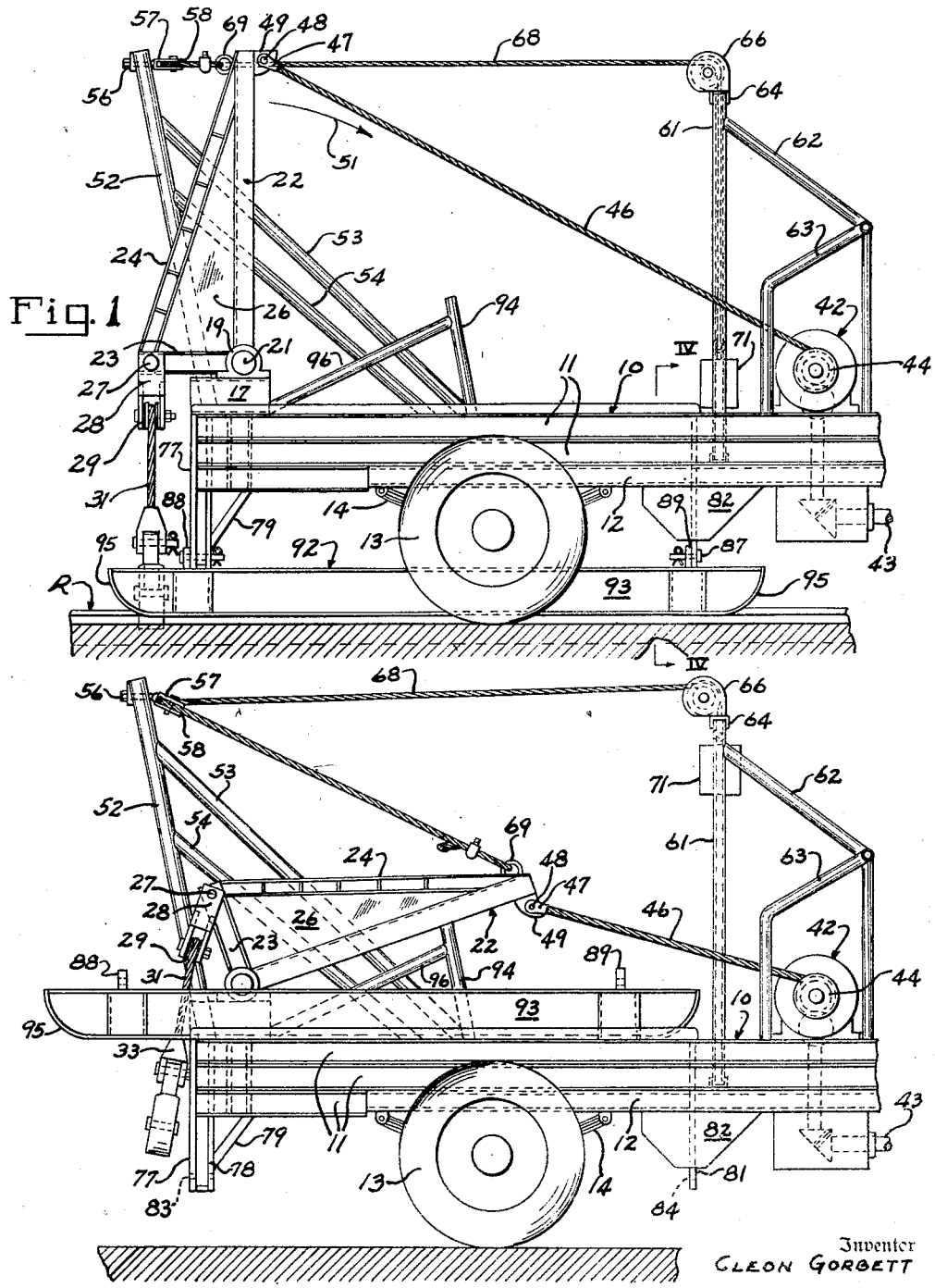
Fig. 1 is a fragmentary side elevational view illustrating my improved apparatus mounted on a vehicle.
Fig. 3 is a view similar to Fig. 1 showing the apparatus with the parts loaded on the vehicle for moving from the job.

Referring now to the drawings for a better understanding of my invention, I show my improved rail pulling apparatus mounted on the cargo deck 10 of a standard motor vehicle. The deck 10 may be reinforced by means of longitudinal I beams 11, suitably secured as by bolting or welding to the framework 12 of the vehicle. The vehicle is equipped with pneumatic tired wheels 13, and the deck frame may be supported from the chassis by the usual leaf springs 14.

Mounted adjacent the rear end of the cargo deck 10 are longitudinally extending, relatively short I beam sections 16 and 17. Mounted on each of the I-beams 16 and 17 is a relatively heavy bearing 18 and 19. Pivotally mounted on a cross shaft 21 journalled in the bearings 18 and 19 is a lever arm 22. As best shown in Figs. 1 and 2, the lever arm 22 has a lever arm 23 welded to its lower pivoted end thereby forming a bell crank. A diagonal brace 24 connects the outer end of the lever arm 23 and the upper end of the lever arm 22 thereby to rigidly connect the two lever arms. The assembly thus formed may be further strengthened by the provision of a triangular plate 26, welded along its edges to the lever arms 22 and 23, and diagonal brace 24.

Pivotally mounted on the free end of the lever arm 23 by means of a pin 27 is a yoke 28, and rotatably mounted in the yoke 28 is a sheave 29. As shown in the drawings, the sheave 29 is disposed with its rotational axis parallel to the longitudinal center line of the vehicle.

Threaded over the sheave 29 is a cable 31. Secured to the ends of the cable are clevises 32 and 33. The clevises are pivotally mounted on pins 34 and 36 to the outer end of a pair of members 37 and 38, pivoted to each other as at 39, and forming a quick connecting grappling hook adapted to engage about the ball portion 41 of a rail R in the manner to be explained. Mounted on the deck of the vehicle adjacent the front thereof is a winch 42, power driven in any suitable manner, for instance by means of a shaft 43 leading to the engine (not shown) of the motor vehicle and transmitted through the gears and shafting shown in Figs. 1 and 3. The winch 42 operates a cable drum 44 about which is wound a cable 46. Cable 46 carries a clevis 47 at its free end which is connected by means of a pin 48 to a plate 49 carried on the upper end of the lever arm 22. It will be apparent that when the cable drum 44 rotates to wind cable 46 thereon the upper end of the lever arm 22 moves forwardly of the vehicle as indicated by the arrow 51, the shaft 21 thereof rotating in the bearings 18 and 19.

Disposed adjacent the rear of the deck 10 is a post or column 52. As shown in the drawings, the post 52 is slightly inclined rearwardly of the deck as viewed from the side, and is vertical as viewed from the rear. The post is held in this position by means of a pair of braces 53 and 54, welded to the post 52 and to the deck 10. The upper end of the post is thus disposed rearwardly of the upper end of the lever arm 22 in all positions of the latter. Secured to the top of the post 52 by means of a bolt 56 is a yoke 57, and rotatably mounted therein is a sheave 58.

Adjacent the front of the deck 10 are a pair of spaced, vertically disposed columns 59 and 61. The columns 59 and 61 are held in vertical position by means of suitable braces 62 and 63 secured to the deck 10. The columns 59 and 61 are connected across the top by means of a member 64. Mounted on the member 64 adjacent the center thereof are brackets 66 between which are rotatably mounted a sheave 67. Passing over the sheaves 67 and 58 is a cable 68. One end of the cable 68 is fixed to the top of the lever arm 22 by means of an I bolt 69. The other end of the cable passes between the columns 59 and 61 and is connected to a weight 71. The weight is guided in vertical movement between the columns 59 and 61 by means of guides 72 and 73 mounted on adjacent sides of the columns, and slides 74 and 76 carried by the weight.

Referring more particularly to Figs. 1 and 2, the rear end of the vehicle framework carries a depending plate 77, reinforced by means of a structural member 78 and a knee brace 79. Forwardly of the wheels 13 I provide a depending plate 81, suitably braced to the chassis frame 12 by side gusset plates 82. The end plate 77 and the plate 81 are provided with a plurality of holes 83 and 84 respectively. The corresponding holes in the plate are equally spaced from the longitudinal center line of the vehicle, thus to form sets of holes for attaching the ground engaging members, as will now be explained.

Secured by means of pins 86 and 87 removably inserted selectively in the sets of holes 83 and 84 are the upstanding rear and front brackets 88 and 89, respectively, carried by a pair of elongated ground engaging members 91 and 92. The members 91 and 92 may each comprise an I beam 93, the lower flanges of which are rounded upwardly to provide skid ends as indicated at 95.

From the foregoing the method of constructing and using my improved rail pulling apparatus may now be readily explained and understood. With the apparatus assembled as shown and described, the vehicle is positioned so that the members 91 and 92 straddle the rail to be removed. By slacking the cable 46 by suitable rotation of the winch 42, the weight 71, through cable 68 pivots the lever arm 22 upwardly to the position shown in Fig. 1 of the drawing, thereby lowering the grappling hook for engagement about the ball 41 of the rail R. It will be understood that if the ball of the rail is entirely beneath the paving or surface of the street, the street is dug out as indicated in Fig. 2 of the drawing to permit the grappling hook to be engaged about the ball thereof. With the hook thus engaged, the winch is now operated to wind the cable 46 on the drum 44, thus rocking the lever in the bearings 18 and 19, raising the outer end of the lever arm 23, and hence the grappling hook. As soon as the load reaches an amount sufficient to depress the springs 14 and the pneumatic tired wheels 13 slightly, the ground engaging members 91 and 92 contact the ground and additional load imposed due to the pulling of the rail is transmitted directly from the deck 10 to the ground through plates 77 and 81. After a section of the rail has been loosened from the roadbed, the vehicle is moved forwardly to engage the rail at a new position, and the cable 46 is slackened, the weight 71 causing the lever arm 22 to assume vertical position.

I preferably position the ground engaging I beams so that they are relatively close to the ground before the pull is commenced. In this way, all damage to the springs 14 as well as the pneumatic tired wheels is eliminated since no abnormal load is imposed on the springs and tires. Furthermore, by providing the spaced holes 83 and 84 in the plates 77 and 84, I am enabled to space the ground engaging I beams a greater or less distance apart thereby to aid in stripping the cement from the rail as the same is pulled upwardly.

Referring particularly to Fig. 3, when it is desired to transport the apparatus from place to place, it is only necessary to withdraw the pins 86 and 87, thereby to remove the ground engaging members 91 and 92, permitting the same to be loaded on the deck of the vehicle as shown in Fig. 3. If desired, the lever arm 22 may be lowered as indicated, and a rest 94 may be provided for the same when in lowered position. The rest 94 may be suitably braced by means of a member 96.

In actual operation, I have found that my improved rail pulling apparatus is highly effective, highly mobile, that it may be mounted on an ordinary, light weight truck, and that it is rugged enough to withstand the stresses and strains imposed on such apparatus. If desired, the ball of the rail may be notched at intervals along its length, thus to break the rail up into short sections when pulled. It is to be noted that the mounting of the ground engaging members 91 and 92 effected by the pin 86 and 87 permits the same to be moved close to the sides of the rail, thus aiding in stripping therefrom the cement or other roadway material in which the rail is embedded.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In apparatus for pulling rails, a vehicle having pneumatic tired supporting wheels and a frame, a lever arm pivotally mounted at its lower end on the vehicle frame, a second lever arm rigidly secured to the lower end of the first mentioned lever arm, a sheave on the free end of the second lever arm, a cable passing over the sheave, a grappling hook secured to the end of the cable adapted for attachment to the rail and disposed when the second lever arm is raised to clamp about the rail, a power driven cable drum on the vehicle, a second cable secured at one end to the drum and at its other end to the top of the first mentioned lever arm, a vertically movable weight on the vehicle, means operatively connecting the weight to the first mentioned lever arm to urge the same to raised position thereby to lower the second lever arm, a pair of elongated ground engaging members, and means to secure the same to the underside of the vehicle frame in position to engage the ground closely adjacent the sides of the rails to be pulled, said members lying relatively close to the ground before the pull on the rail commences thereby to contact the ground and transmit pulling stresses from the frame to the ground.

2. Apparatus as defined in claim 1 in which the weight is disposed for movement in vertical guides mounted on the vehicle, and in which a cable connects the weight to the upper end of the first mentioned lever arm.

3. Apparatus as defined in claim 1 in which the means to secure the ground engaging members to the underside of the frame comprises longitudinally spaced members depending from the frame, there being a plurality of sets of aligned holes in said depending members spaced on either side of the longitudinal center of the vehicle, upstanding brackets adjacent the end of said ground engaging members having holes therein, and pins adapted to be removably engaged in said holes in the brackets and a selected set of said aligned holes in the depending members.

4. In apparatus for pulling rails from a roadbed, a vehicle having pneumatic tired wheels and a frame, a lever arm pivotally mounted on the frame adjacent the rear ends thereof, a second lever arm rigidly secured to the first mentioned lever arm adjacent the lower end thereof and overhanging the rear end of the vehicle frame, a cable operatively connected to the free end of the second lever arm, a quick connecting clamp carried by the cable and adapted to engage the rail, a cable drum on the vehicle frame forwardly of the first mentioned lever arm, a second cable wrapped about the drum and having one end secured to the top of the first mentioned lever arm, a guy post mounted on the vehicle frame adjacent the rear end and with its upper end disposed rearwardly of the upper end of the first mentioned lever arm, a sheave secured to the guy post adjacent its upper end, a third cable passing over the sheave and secured at one end to the upper end of the first mentioned lever arm, vertical guides mounted on the frame forwardly of the first mentioned lever arm, a weight slidably disposed between the vertical guides, the other end of said third cable being connected to the weight, and a pair of road bed engaging members extending parallel to the rail removably secured beneath the frame and disposed to engage the roadbed closely adjacent the sides of the rail, said roadbed engaging members being disposed closely adjacent the roadbed before the pull on the rail commences thereby to engage the roadbed before excessive load is imposed on the vehicle wheels.

CLEON GORBETT.

REFERENCES CITED

The following references are of record in the file of this patent:

UNITED STATES PATENTS

| Number | Name | Date |
|---|---|---|
| 202,107 | Haines | Apr. 9, 1878 |
| 247,705 | Stoddard | Sept. 27, 1881 |
| 2,271,311 | Shambaugh | Jan. 27, 1942 |
| 2,353,381 | Allderige | July 11, 1944 |